(12) United States Patent
Nukala et al.

(10) Patent No.: US 12,307,414 B2
(45) Date of Patent: *May 20, 2025

(54) AUTOMATED EQUIPMENT TRACKING FOR SERVICE TECHNICIANS

(71) Applicants: AT&T Intellectual Property I, L.P., Atlanta, GA (US); Interwise Ltd., Airport City (IL)

(72) Inventors: Sreenivas Nukala, Bellevue, WA (US); Adam Hersh, Highland Park, IL (US); Nir Ganani, Herzelia (IL); Satish Janardan, Plano, TX (US); Bryan Goettsch, Gaithersburg, MD (US); Donald Willis, Arlington, TX (US); Quang Cao, Lawrenceville, GA (US); Saurav Patel, Frisco, TX (US); Jesse Taylor, Dallas, TX (US); Mirage Hamdy, Katy, TX (US); Valerie Smith, Loganville, GA (US); Meni Sasson, Kochav-Yair (IL); Amir Benyamin, Kfar-Truman (IL); Stephen Alexander Roberts, Jr., Fort Worth, TX (US)

(73) Assignees: AT&T Intellectual Property I, L.P., Atlanta, GA (US); Interwise Ltd., Airport City (IL)

(*) Notice: Subject to any disclaimer, the term of this patent is extended or adjusted under 35 U.S.C. 154(b) by 251 days.

This patent is subject to a terminal disclaimer.

(21) Appl. No.: 17/555,948

(22) Filed: Dec. 20, 2021

(65) Prior Publication Data
US 2022/0114540 A1  Apr. 14, 2022

Related U.S. Application Data

(63) Continuation of application No. 16/712,649, filed on Dec. 12, 2019, now Pat. No. 11,222,308.

(51) Int. Cl.
G06Q 10/087 (2023.01)
G06Q 10/20 (2023.01)

(52) U.S. Cl.
CPC .......... *G06Q 10/087* (2013.01); *G06Q 10/20* (2013.01)

(58) Field of Classification Search
CPC .......................... G06Q 10/087; G06Q 10/02
See application file for complete search history.

(56) References Cited

U.S. PATENT DOCUMENTS

| 2007/0043634 A1 | 2/2007 | Bar |
| 2008/0143532 A1* | 6/2008 | Murrah .............. G06K 19/0717 340/572.4 |

(Continued)

OTHER PUBLICATIONS

U.S. Office Action dated Apr. 1, 2021 in U.S. Appl. No. 16/712,649.

(Continued)

*Primary Examiner* — Allen C Chein
(74) *Attorney, Agent, or Firm* — Hartman & Citrin LLC

(57) ABSTRACT

The concepts and technologies disclosed herein are directed to automated tool tracking for service technicians. According to one aspect disclosed herein, a tool tracking system can collect tool data from a vehicle system of a vehicle. The tool data can be associated with a tool that is to be utilized by a service technician to provide, at least in part, a service at a customer location. The tool tracking system can store the tool data in a data store. The tool tracking system can map the tool data to the vehicle and can determine when the tool is no longer mapped to the vehicle. This can be indicative of the tool having been left, for example, at the customer location. The tool tracking system can create an alert to inform the service technician and/or another entity that the tool is no longer mapped to the vehicle.

18 Claims, 7 Drawing Sheets

(56) References Cited

U.S. PATENT DOCUMENTS

| | | | |
|---|---|---|---|
| 2013/0109375 A1* | 5/2013 | Zeiler | G01S 19/16 |
| | | | 455/552.1 |
| 2017/0091634 A1 | 3/2017 | Ritter | |
| 2018/0068542 A1* | 3/2018 | Mondal | H04W 4/029 |
| 2018/0197225 A1* | 7/2018 | Mohiuddin | G06Q 10/00 |
| 2019/0266808 A1 | 8/2019 | Merg | |
| 2020/0074768 A1 | 3/2020 | Rozint | |
| 2020/0336492 A1 | 10/2020 | Thorley | |
| 2020/0342420 A1 | 10/2020 | Zatta | |

OTHER PUBLICATIONS

U.S. Notice of Allowance dated Oct. 21, 2021 in U.S. Appl. No. 16/712,649.

* cited by examiner

AUTOMATED EQUIPMENT TRACKING FOR SERVICE TECHNICIANS

CROSS-REFERENCE TO RELATED APPLICATIONS

This application is a continuation of and claims priority to U.S. patent application Ser. No. 16/712,649, entitled "Automated Equipment Tracking for Service Technicians," filed Dec. 12, 2019, now U.S. Pat. No. 11,222,308, which is incorporated herein by reference in its entirety.

BACKGROUND

Today, in addition to utilities such as electricity, gas, and water, services such as Internet and television have become essential for many customers. These services often require installation of equipment at the customer's location (e.g., home or business). For this reason, service technicians are sent to the customer's location to install new equipment, repair existing equipment, and/or perform maintenance on existing equipment. A service technician may be equipped with specialized tools to perform at least some of these tasks. These specialized tools are expensive and it is incumbent upon the service technician to ensure these tools are not lost, stolen, or otherwise misplaced such as being left at the customer's location. At times, a service technician may arrive at the customer's location before determining that they do not have a specific tool needed to complete a job. This requires the job to be rescheduled and can result in dissatisfied customers, in addition to the time and money lost by the service technician and the service provider.

Some service providers have implemented tool tracking mechanisms. A problem with these mechanisms is that they place additional burden on the service technician to not only timely and correctly perform his or her daily job duties, but also to manually log when a tool is used so that tool inventory can be maintained with some accuracy. Other solutions exist in which tools are labeled with tracking labels that can be scanned to keep track of tool inventory. This requires additional scanning equipment and still relies on the service technician to manually scan the tools.

SUMMARY

Concepts and technologies disclosed herein are directed to automated equipment tracking for service technicians. According to one aspect of the concepts and technologies disclosed herein, a tool tracking system can collect tool data from a vehicle system of a vehicle. The tool data can be associated with a tool that is to be utilized by a service technician to provide, at least in part, a service at a customer location. The tool tracking system can store the tool data in a data store. The tool tracking system can map the tool data to the vehicle and can determine when the tool is no longer mapped to the vehicle. This can be indicative of the tool having been left, for example, at the customer location. The tool tracking system can create an alert to inform the service technician and/or another entity that the tool is no longer mapped to the vehicle.

In some embodiments, the tool tracking system can collect the tool data from the vehicle system in response to a scan performed by the vehicle system. The scan can be used to identify the tool via a tool sensor (e.g., via BLUETOOTH or other technology) associated with the tool. The tool data can include a sensor address that uniquely identifies the tool sensor.

The tool tracking system also can collect vehicle data from the vehicle system. The vehicle data can uniquely identify the vehicle and a location of the vehicle when the scan was performed. For example, prior to the vehicle leaving a starting location to travel to the customer location. The tool tracking system can map the tool data to the vehicle data and to the location of the vehicle after the scan was performed. The tool tracking system can determine the tool is no longer mapped to the vehicle based upon a further scan performed by the vehicle system. The further scan can be performed, for example, when the vehicle is started prior to leaving the customer location, or when the vehicle arrives back at the starting location. In this case, the further scan would not identify the sensor address that uniquely identifies the tool sensor, and therefore, the tool tracking system can determine that the tool is no longer with the vehicle.

In some embodiments, the tool tracking system can provide the alert to a device associated with the service technician to inform the service technician that the tool is no longer mapped to the vehicle. Additionally or alternatively, the tool tracking system can provide the alert to a service provider management system that can present the alert to a supervisor of the service technician to inform the supervisor that the tool is no longer mapped to the vehicle.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
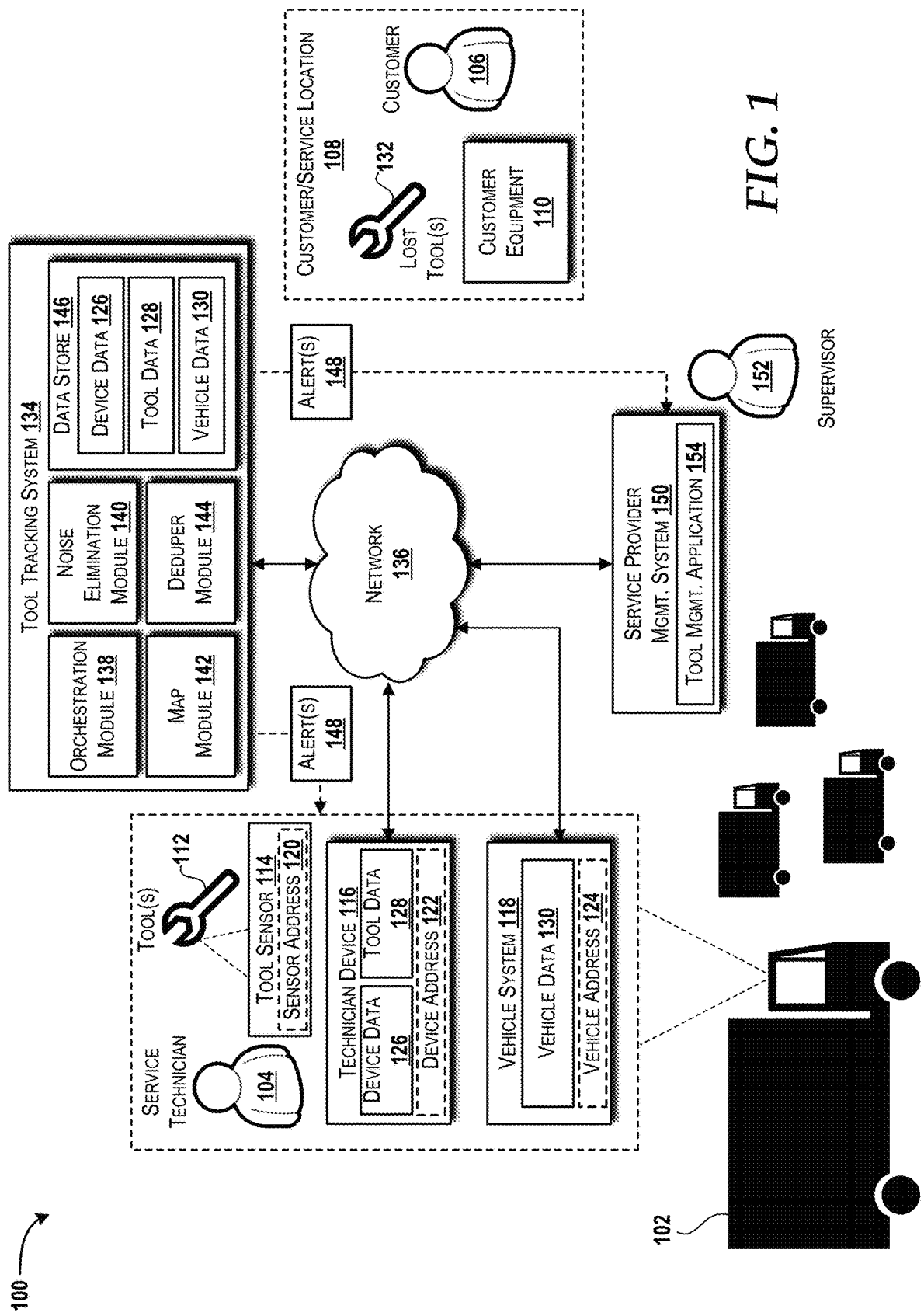
FIG. 1 is a block diagram illustrating aspects of an illustrative operating environment for various concepts disclosed herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of automatic equipment tracking for service technicians will be described.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes a service technician's vehicle ("vehicle") 102. The vehicle 102 can be an individual vehicle or can be part of a fleet of two or more vehicles. The vehicle 102 can be used by one or more service technicians 104 (hereinafter, at times, referred to individually as "a service technician 104," or collectively as "service technicians 104") who work for, are contracted by, or are otherwise associated with a service provider that provides one or more services to one or more customers 106 (hereinafter, at times, referred to individually as "a customer 106," or collectively as "customers 106"). The customers 106 can be associated with one or more customer locations (also referred to as service locations) 108 (hereinafter, at times, referred to individually as "a customer (or service) location 108," or collectively as "customer (or service) locations 108") at which customer equipment 110 is to be installed, repaired, replaced, or otherwise serviced by the service technician 104. The vehicle 102 can be equipped to carry one or more tools 112 (hereinafter, at times, referred to individually as "a tool 112," or collectively as "tools 112") to be used by the service technician 104 to install, repair, replace, or otherwise service the customer equipment 110, or else facilitate, at least in part, the service provider in being able to provide a service to the customer 106 at the customer location 108.

The vehicle 102 can be a car, truck, van, or any other vehicle. The vehicle 102 can be part of a fleet of vehicles that the service provider maintains for the service technician 104 as part of his/her employment or contract. The vehicle 102 alternatively can be individually owned and/or operated by the service technician 104. In some embodiments, the vehicle 102 is a driver-operated vehicle and is manually driven by the service technician 104. In some embodiments, the vehicle 102 is capable of operating in at least a partially autonomous control mode. In some embodiments, the vehicle 102 can be a fully autonomous vehicle. In some embodiments, the vehicle 102 can operate as a Level 3 or Level 4 vehicle as defined by the National Highway Traffic Safety Administration ("NHTSA"). The NHTSA defines a Level 3 vehicle as a limited self-driving automation vehicle that enables a driver to cede full control of all safety-critical functions under certain traffic or environmental conditions and in those conditions to rely heavily on the vehicle to monitor for changes in those conditions requiring transition back to driver control. The driver is expected to be available for occasional control, but with sufficiently comfortable transition time. The GOOGLE car, available from GOOGLE, is an example of a limited self-driving automation vehicle. The NHTSA defines a Level 4 vehicle as a full self-driving automation vehicle that is designed to perform all safety-critical driving functions and monitor roadway conditions for an entire trip to a destination. Such a design anticipates that the driver will provide destination or navigation input, but is not expected to be available for control at any time during the trip.

The service technician 104 can be an employee of or contractor for a service provider. For purposes of explanation, the service technician 104 will be described herein as an employee of a service provider that provides one or more services to the customers 106 at the customer locations 108. The service provider can be a telecommunications service provider that provides landline telephone service, Internet service, and/or other telecommunications services. The service provider can be a television service provider that provides cable, satellite, IP, and/or other television services. Utility service providers such as power companies, water companies, sewage companies, and the like are also contemplated. It should be understood that the concepts and technologies disclosed herein can be applied to any service type provided by any service provider where the service technician 104 utilizes the tool(s) 112 to perform his or her job. As such, the examples provided herein should not be construed as being limiting in any way.

The customer 106 can be an individual, a family, a group of customers, a neighborhood, a business, a government body, or any other entity that is at least partially responsible for requesting that the service be provided at the customer location 108. The customer 106 may request the service themselves or may have the service requested on their behalf.

The customer location 108 may be a home or a place of business of the customer 106. The customer location 108 may be any other location at which service is to be provided. The customer location 108 therefore may be associated with a physical address, latitude/longitude coordinates, a landmark, a mile marker, a city/county/state/country border, or the like that may be useful to the service technician 104 in locating the customer location 108.

The customer equipment 110 can be or can include anything that is used to at least partially provide the service to the customer 106 at the customer location 108. As such, the customer equipment 110 can include customer premises equipment ("CPE") such as an Internet modem, router, modem/router combination, switch, antenna, satellite dish, set-top box, remote control, combinations thereof, and/or the like. The customer equipment 110 alternatively or additionally may include batteries, power supplies, wire, cable (e.g., fiber optic, copper, or coaxial cable), Ethernet cable, conduit, and/or other equipment that is used to provide the service to the customer 106 at the customer location 108. As described herein, the customer equipment 110 can be installed, repaired, replaced, or otherwise serviced by the service technician 104. The customer equipment 110 may be owned by the service provider, the customer 106, or it may be jointly owned. The customer equipment 110 may be provided to the customer 106 for free, a one-time fee, or a recurring fee (e.g., a monthly or yearly fee). It should be understood that the concepts and technologies disclosed herein can be implemented regardless of any contractual obligations between the customer 106 and the service provider. As such, any particular business arrangement that may be representative of a contract is merely exemplary, and should not be construed as being limiting in any way.

The tools 112 can be utilized by the service technician 104 to install, repair, replace, otherwise service the customer equipment 110, or else facilitate, at least in part, the service to be provided the customer 106 at the customer location 108. As such, the tool 112 can be any tool the service technician 104 may need to use in support of his or her job. For example, the tool 112 can be any type of hand tool (e.g., screwdrivers, wrenches, pliers, snips, and/or the like), any type of power tool (e.g., battery or AC power), or any type of specialty tool (e.g., a fiber splicer, testing equipment, and/or the like). The tool 112 should not be construed as being limited to any specific tool, any specific brand of tool, any specific complexity of tool, or any specific type of tool. As such, the tool 112 can include anything from a pencil to specialized testing equipment used for fiber optic installations. It should be understood, however, that the benefits of the concepts and technologies disclosed herein may be more fully realized when the tool 112 is particularly expensive and/or limited in quantity (e.g., shared among several service technicians 104), although this may not necessarily be the case.

The tool 112 can be associated with a tool sensor 114. The tool sensor 114 can be attached to the tool 112, installed in the tool 112, manufactured as part of the tool 112, or otherwise physically associated with the tool 112 such that the tool sensor 114 can communicate the presence of the tool 112 to a technician device 116 and/or a vehicle system 118. The presence can be communicated as proximity, location, or both. The tool sensor 114, in some embodiments, can be or can include one or more short-range radio communications components such as BLUETOOTH, BLUETOOTH Low Energy ("BLE"), ZIGBEE, Z-WAVE, RFID, adhoc WI-FI, combinations thereof, and/or the like. The tool sensor 114 can be uniquely identified by a sensor address 120. The sensor address 120 can be a network address that enables the tool sensor 114 to be uniquely identified by and communicate with the technician device 116 and/or the vehicle system 118. For example, the sensor address 120 may be a BLUETOOTH address, a media access control ("MAC") address, a ZIGBEE address, a Z-WAVE address, a WI-FI access point name, or the like. As used herein, the tool sensor 114 will be described as being configured to communicate with the technician device 116 and the vehicle system 118 via a BLE connection. Moreover, the sensor address 120 will be described as a BLE address. BLE and the corresponding protocols and standards are well-known, and therefore additional explanation regarding how the tool sensor 114 communicates with the technician device 116 and/or the vehicle system 118 via BLE will not be described herein.

The technician device 116 can be a mobile telephone, a smartphone, a tablet, a smart watch, a fitness device, a pair of smart glasses, an augmented reality ("AR") device, a virtual reality ("VR") device, a computer of any form factor, another computing device, an Internet of Things ("IoT") device, an unmanaged or managed (e.g., by the service provider) device, and/or the like. It should be understood that the functionality of the technician device 116 can be provided by a single device, by two or more similar devices, and/or by two or more dissimilar devices. The technician device 116 can be associated with a device address 122 that enables the technician device 116 to be uniquely identified by and to communicate with the tool sensor 114 and/or the vehicle system 118. For purposes of explanation, and not limitation, the technician device 116 will be described as a mobile device such as a smartphone or tablet. Moreover, the technician device 116 will be described as being capable of communicating with the tool sensor 114 to ascertain the presence (e.g., proximity and/or location) of the tool 112 to the technician device 116, and therefore, presumably, the service technician 104 as well. An example architecture for a mobile device will be described below with reference to FIG. 4.

The vehicle system 118 can be or can include an on-board diagnostics ("OBD") system, a hands-free telephone system, a vehicle entertainment system (also commonly referred to as "an infotainment system"), a vehicle navigation system, a global positioning system ("GPS"), a vehicle engine control unit ("ECU"), and/or another system associated with the vehicle 102. The vehicle system 118 may be retrofitted into the vehicle 102 as aftermarket equipment or may be made available as standard or optional original equipment manufacturer ("OEM") equipment of the vehicle 102. It should be understood that the functionality of the vehicle system 118 can be provided by a single device, by two or more similar devices, and/or by two or more dissimilar devices. The vehicle system 118 can be associated with a vehicle address 124 that enables the vehicle system 118 to be uniquely identified by and to communicate with the tool sensor 114 and/or the technician device 116. For purposes of explanation, and not limitation, the vehicle system 118 will be described as an OBD2 system, which is a common component of many vehicles today. In addition, the vehicle system 118 will be described as being capable of communicating with the tool sensor 114 via the sensor address 120 to ascertain the presence (e.g., proximity and/or location) of the tool 112 to the vehicle system 118.

It should be understood that the sensor address 120, the device address 122, and the vehicle address 124 may, at times, be referred to as a single address. In some embodiments, the tool sensor 114, the technician device 116, and the vehicle system 118 are network-addressable to communicate with each other via their respective addresses, such as in accordance with BLE protocols. The sensor address 120, the device address 122, and the vehicle address 124 may additionally include other addresses that enable the tool sensor 114, the technician device 116, and the vehicle system 118 to communicate via other protocols. As such, the sensor address 120, the device address 122, and the vehicle address 124 are intended to be representative of any network address or combination of network addresses associated with the tool sensor 114, the technician device 116, and the vehicle system 118, respectively. Moreover, for purposes of cataloging, tracking, or otherwise referring to (e.g., colloquially) the tool sensor 114, the technician device 116, and the vehicle system 118, these components may have names (e.g., tool sensor 1, 2, 3, etc.; technician device 1, 2, 3, etc.; and vehicle system 1, 2, 3, etc.), numeric or alphanumeric identifiers (e.g., TS1, TS2, TS3, etc.; TD1, TD2, TD3, etc.; and VS1, VS2, VS3, etc.), or any other naming/identifying convention. In some implementations, network addresses and names/identifiers are combined in a database to easily identify the tool sensor 114, the technician device 116, and the vehicle system 118 from other tool sensors 114, technician devices 116, and vehicle systems 118.

The technician device 116 is illustrated as having device data 126 and tool data 128 stored thereon, such as in memory component of the technician device 116. Example memory components of the technician device 116 are illustrated herein with reference to FIG. 3 (computer system) and FIG. 4 (mobile device). Briefly, the memory component of the technician device 116 can include, but is not limited to, random access memory ("RAM"), volatile and non-volatile memory devices, semi-permanent or permanent memory types; for example, tape-based media, optical media, flash media, hard disks, combinations thereof, and the like. Moreover, the memory component of the technician device 116 can be separate from the technician device 116, integrated within the technician device 116, and, in some embodiments, can be provided, at least in part, as a removable memory embodied, for example, as a memory card such as a secure digital card.

The device data 126 can be or can include any data associated with the technician device 116. The device data 126 can include device identifying information such as an international mobile equipment identity ("IMEI"), an international mobile subscriber identity ("IMSI"), a mobile subscriber integrated services digital network ("MSISDN"), combinations thereof, and the like. The device data 126 can include information associated with the service technician 104, including name, address, telephone number, and/or other information capable of identifying the service technician 104. The device data 126 can include calendar information, photos, videos, other files, email, SMS messages, MMS messages, other message types, social media information, phone call records, web browsing history, application-specific data, passwords, combinations thereof, and the like. The device data 116 can include location information for where the technician device 116 is located at a given time. The examples of the device data 126 disclosed herein should not be construed as being limiting in any way.

The tool data 128 can be used by the technician device 116 to track the tool(s) 112. The tool data 128 can include data for the tool(s) 112 for which the service technician 104 is responsible. For example, the service technician 104 may have a base set of tools 112 that he or she keeps on the vehicle 102 at all times, along with additional tools (e.g., specialty tools) that are associated with the service technician 104 on a temporary basis such as a per-service-call basis or per-job basis. The tool data 128 can include tool identifying information such as a general name, brand name, serial number, combinations thereof, and/or the like. The tool data 128 also can associate tool identifying information with the sensor address 120 to enable the technician device 116 to communicate with a particular tool. The tool data 128 can include signal strength of a connection between the tool sensor 114 and the technician device 116 and/or the vehicle system 118. The examples of tool data 128 disclosed herein should not be construed as being limiting in any way.

The vehicle system 118 is illustrated as having vehicle data 130 stored thereon, such as in memory component of the vehicle system 118. Example memory components of the vehicle system 118 are illustrated herein with reference to FIG. 3 (computer system) and FIG. 4 (mobile device). Briefly, the memory component of the vehicle system 118 can include, but is not limited to, RAM, volatile and non-volatile memory devices, semi-permanent or permanent memory types; for example, tape-based media, optical media, flash media, hard disks, combinations thereof, and the like. Moreover, the memory component of the vehicle system 118 can be separate from vehicle system 118, integrated within vehicle system 118, and, in some embodiments, can be provided, at least in part, as a removable memory embodied, for example, as a memory card, such as a secure digital card.

The vehicle data 130 can be or can include any data associated with the vehicle 102. The vehicle data 130 can include vehicle identifying information such vehicle identification number ("VIN"), OBD identifier, license plate number, make, model, trim, engine type, engine displacement, transmission type, options equipped, combinations thereof, and/or the like. The vehicle data 130 can include operational information such as ignition position (e.g., ON, OFF, or accessory), GPS data, OBD data, ECU data, combinations thereof, and/or the like. The vehicle data 130 can include location information for where the vehicle 102 is located at a given time.

In the illustrated example, the service technician 104 has misplaced/lost one or more of the tools 112—shown as lost tool(s) 132. For example, the service technician 104 might leave the customer location 108 and forget the lost tools 132 at the customer location 108. The reason(s) why the service technician 104 misplaced/lost the tool(s) 112 is irrelevant to this disclosure. The concepts and technologies disclosed herein are capable of tracking the lost tools 132 in many scenarios not explicitly described herein. As such, the examples provided herein should not be construed as being limiting in any way.

The technician device 116 and the vehicle system 118 are illustrated as being in communication with a tool tracking system 134 via a network 136. The illustrated tool tracking system 134 includes software modules for executing various operations described herein. In particular, the tool tracking system 134 can include an orchestration module 138, a noise elimination module 140, a map module 142, and a deduper module 144.

The tool tracking system 134 also can include a data store 146 that is used to store, at least in part, the device data 126, the tool data 128, and the vehicle data 130. The tool tracking system 134 can receive the device data 126, the tool data 128, and/or the vehicle data 130 through various communication paths, such as user datagram protocol ("UDP"), transfer control protocol ("TCP"), and/or hypertext transfer protocol ("HTTP"). Based upon operations performed via execution of the software modules, the tool tracking system 134 can create one or more alerts 148 to notify the service technician 104 of the lost tool(s) 132, as will be described in greater detail herein. The alert(s) 148 can be sent to the technician device 116, the vehicle system 118, and/or a service provider management system 150, which is also illustrated as being in communication with the network 136. An example cloud computing platform that can be used to implement the tool tracking system 134 will be described in detail herein with reference to FIG. 6.

The orchestration module 138 can receive input data such as the device data 126 and/or the tool data 128 from the technician device 116, and/or the vehicle data 130 from the vehicle system 118. The orchestration module 138 can store the data 126/128/130 in the data store 146 as shown. The orchestration module 138 can be capable of understanding any protocol utilized by the technician device 116 and/or the vehicle system 118. In addition, the orchestration module 138 can receive the data 126/128/130 in a format that is sent without manipulation (e.g., converting data types) to more efficiently store the data 126/128/130 in the data store 146. Storing the data without manipulation allows the orchestration module 138 to be modified to accommodate the addition of new protocols and data fields. The orchestration module 138 orchestrates data processing with the other modules disclosed herein. Some example operations that can be performed by the orchestration module 138 will be described in greater detail below with reference to FIGS. 2A-2B.

The noise elimination module 140 can be invoked by the orchestration module 138 from time-to-time to clean, reformat, and store the cleaned and reformatted data in the data store 146. The noise elimination module 140 can remove any "noise" from the data 126/128/130. Sources of "noise" can be, but are not limited to, data collected from new tools that were recently put into service, data collected inconsistently over a period of time, data collected from sources of interfaces, combinations thereof, and/or the like. Some example operations that can be performed by the noise elimination module 140 will be described in greater detail below with reference to FIGS. 2A-2B.

The noise elimination module 140 can use the data 126/128/130 stored by the orchestration module 138 to determine if any unassociated data is present, such as, for example, BLE tags (MAC IDs) that are reported once and are not repeated over a defined interval (e.g., 4 hours, 1 day, or 1 week). This noise identification interval can be a learnt variable by the noise elimination module 140 based on feedback provided by the orchestration module 138. The noise elimination module 140 can remove one or more reported BLE tags if they are rarely reported (e.g., once during the noise interval), thus removing interference noise caused by being in proximity of the vehicle system 118 and/or technician device 116 being present to other non-relevant vehicles or devices. The noise elimination module 140 also can use certain parameters such as relative signal strength of a connection to the vehicle system 118 (or technician device 116 as the case may be) to approximate the distance to the vehicle 102 and/or technician device 116 in resolving conflicts of one tool 112 that is being reported by two different devices. If the signal strength varies too much (e.g., determined by a signal strength variability window), the noise elimination module 140 can consider a weaker signal as noise and remove the record that pertains to that particular tool 112.

The map module 142 can be invoked by the orchestration module 138 to create a unique representation for each of the vehicles 102 in a fleet after removing any "noise" reported by the cross communication that can occur during various events occurring in the field. The map module 142 can arrange the data 126/128/130 in a way that represents the reality of its usage. However, there are reasons why the map module 142 may fail to get a full picture/map, and the map module 142 therefore can communicate back to the orchestration module 138 what the error rate is, which can be considered for setting a noise interval later on when the noise elimination module 140 is invoked.

The map module 142 can use the data 126/128/130 left by the noise elimination module 140 along with supplied employee hierarchy information to understand each service technician 104 who is driving each of the vehicles 102, carrying which tools 112, and to which supervisor 152 each service technician 104 reports. The map module 142 can achieve this by taking a single record of the vehicle data 130 (e.g., a vehicle reports that it recognized vehicle ignition ON, drove 1 mile, and reported a location). The map module 142 can utilize this record and can scan for a specific VIN number of the vehicle 102 that the tool 112 was in that day to associate a specific tool 112 with being in a specific vehicle 102. The map module 142 can scan for other events that the tool 112 may have reported to indicate if the tool 112 was pulled off the vehicle 102, or if the ignition of the vehicle 102 was switched off for the day. The map module 142, as it scans through the original unassociated data, also can identify the sensor address 120 as being in the vehicle 102 that was reported by the tool 112.

The map module 142 can scan through all unassociated (but cleaned—i.e., processed by the noise elimination module 140) data 126, 128, 130 to build associations that indicate consistent association, such as the tool sensor 114 of the tool 112 being in the vehicle 102 reported through the vehicle system 118 all the way from a starting location to an ending location when the vehicle ignition was switched off, and also that the vehicle 102 is driven by the service technician 104 who reports to a supervisor 152.

During this transformation of the data 126/128/130 from unassociated to structured, the map module 142 can find various errors/conflicts such as the sensor address 120 being reported in two or more of the vehicles 102. The map module 142 can use time and location information to resolve a conflict. For example, the map module 142 can resolve a conflict that the tool 112 associated with the sensor address 120 is shown as being present in two vehicles 102 parked/idle next to one another in a vehicle depot as picked up by the vehicle system 118 associated with each vehicle 102. However, as those vehicles 102 depart to various destinations, the map module 142 can determine that the sensor address 120 is present in the first vehicle 102 and not the second vehicle 102, or vice versa. In some instances, the map module 142 might not receive such clarification, and therefore may mistakenly count these conflicts. The map module 142 can identify similar conflicts with the service technician 104 using one vehicle 102 today but later using another vehicle 102 from the same or a different fleet. As dispatch job data being used gets cleared, the map module 142 can attempt to resolve any conflicts. But if a conflict is not cleared, it can be counted as a different category of data conflict category.

The map module 142 can store the resolved structured data as well as retain unresolved data for future use and can communicate current conflicts to the orchestration module 138. The orchestration module 138 can use this data to improve the noise interval.

The deduper module 144 can be invoked by the orchestration module 138 to remove duplicate entries such as the sensor address 120 being associated with multiple vehicles 102 during a trip to the customer location 108. The deduper module 144 can mark the duplicate entries for future processing. If the identified duplicates remain and are not resolved within a specified de-dupe time window, the deduper module 144 can remove references to the associated sensor address 120 until the tool sensor 114 reports additional data 128.

The service provider management system 150 can be used by a supervisor 152 to oversee any number of service technicians 104 and their associated vehicles 102 and tools 112. The service provider management system 150 can execute a tool management application 154 that provides an interface through which the supervisor 152 can view the status of the tool 112, the technician device 116, the vehicle system 118, and/or other information associated with the service technician 104 during the course of his or her daily job duties, such as visiting the customer 106 at the customer location 108 to service the customer equipment 110. The tool management application 154 also can present the alert(s) 148 to the supervisor 152. The tool management application 154 may include additional functionality such as to facilitate communications (e.g., text, voice, and/or video) with the service technician 104 via the technician device 116 and/or the vehicle system 118. The network 136 can encompass any and all networks used to enable communications between any combination of the technician device 116, the vehicle system 118, the tool tracking system 134, and the service provider management system 150. As such, the network 136 can include any combination of access networks, mobile communications networks (e.g., a cellular network), IP networks, and the Internet, for example. An exemplary embodiment of the network 136 is illustrated and described herein with reference to FIG. 5.

Figure 2A:
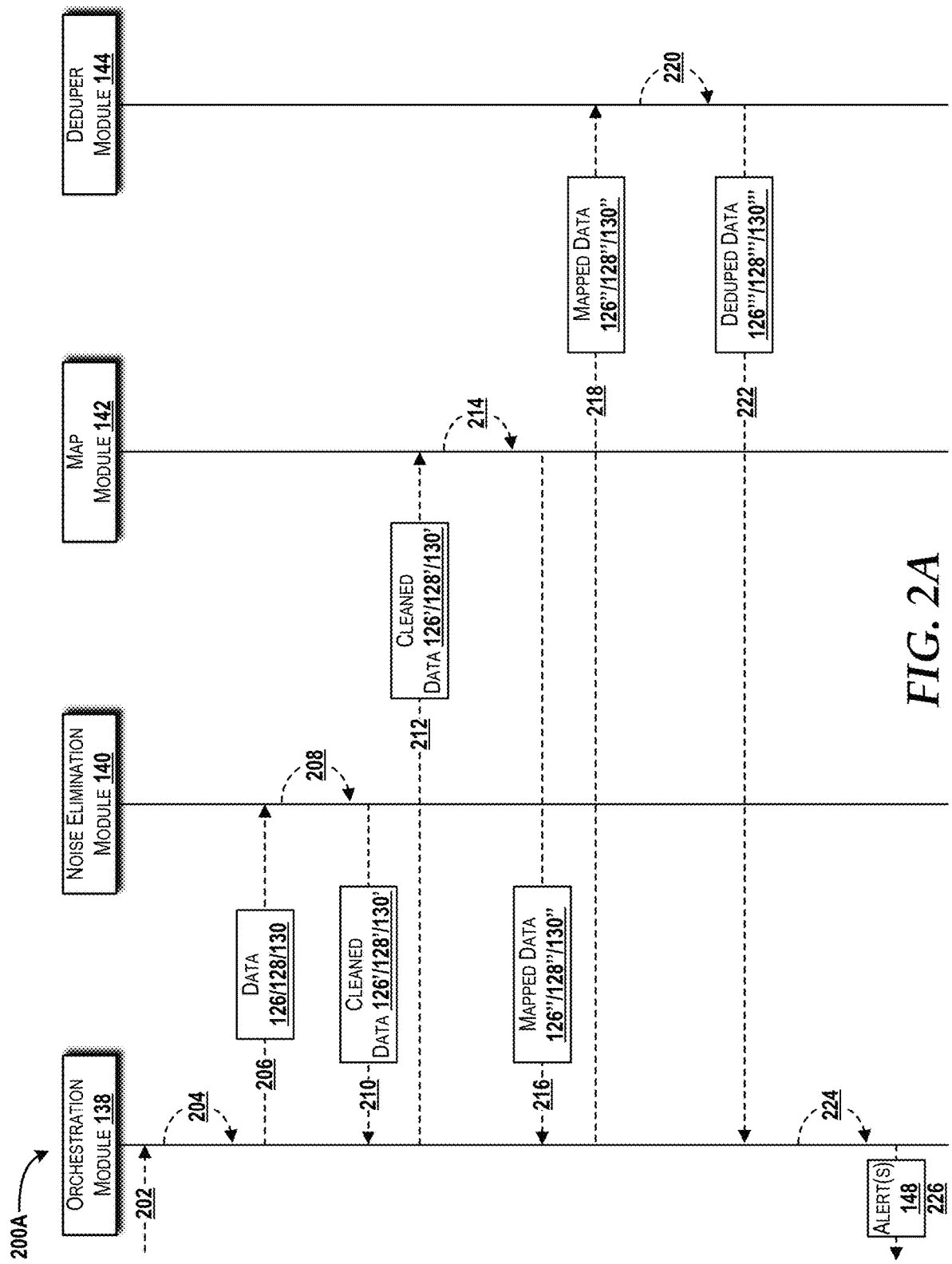
FIG. 2A is a ladder diagram and FIG. 2B is a corresponding flow diagram illustrating aspects of a method for automatically determining that a tool has been lost, identifying the lost tool, and providing an alert to notify a service technician of the lost tool, according to an illustrative embodiment.
Figure 2B:
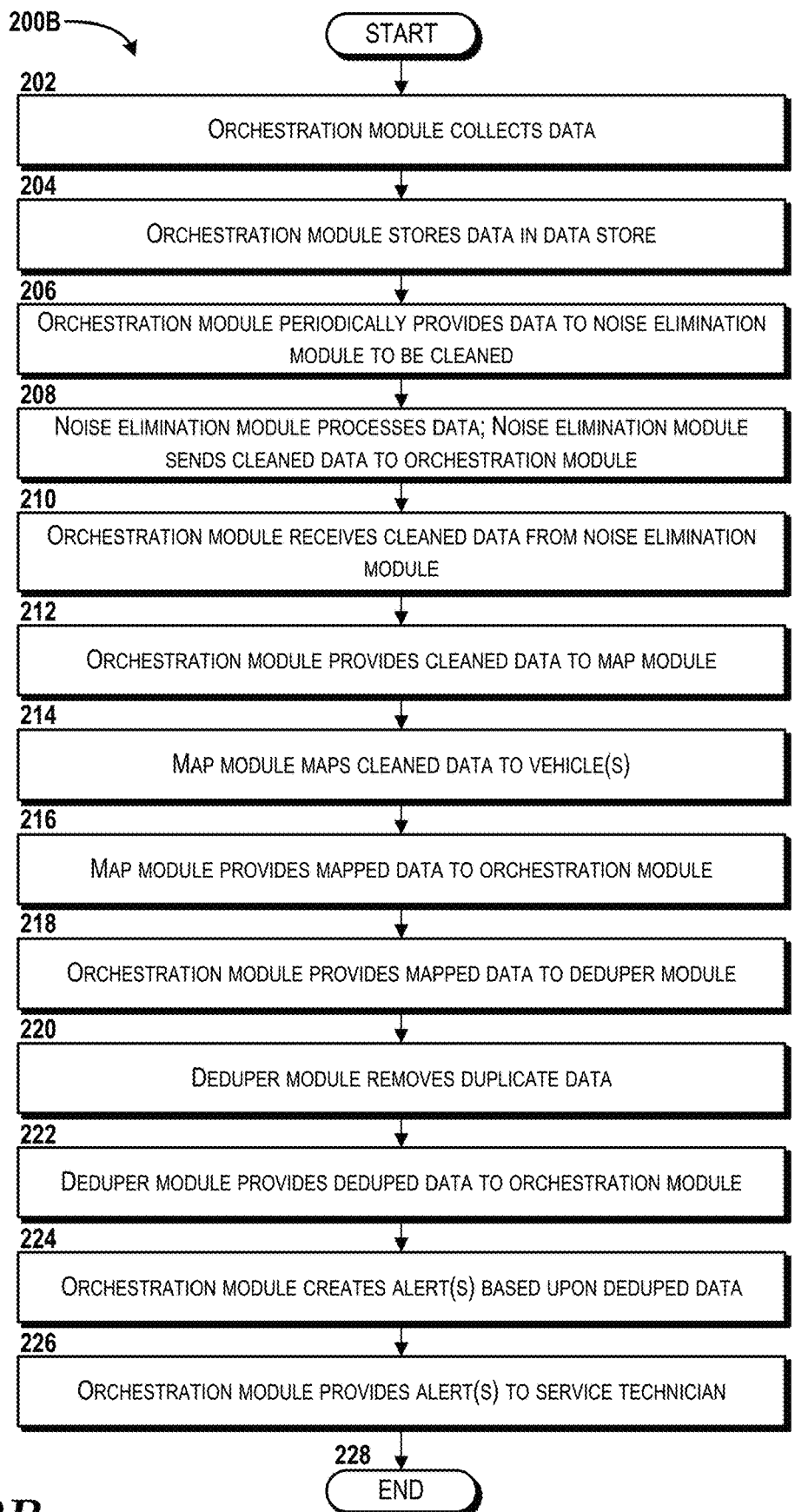

Turning now to FIGS. 2A-2B, a ladder diagram 200A and corresponding flow diagram 200B that collectively illustrate aspects of a method 200 for automatically determining that a tool 112 has been lost, identifying the lost tool 132, and providing an alert 148 to notify a service technician 104 of the lost tool 132 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of the technician device 116, the vehicle system 118, the tool tracking system 134, the service provider management system 150, and/or one or more other computing systems and/or devices disclosed herein to perform operations.

For purposes of illustrating and describing some of the concepts of the present disclosure, the methods disclosed herein are described as being performed, at least in part, by the tool tracking system 134 via execution of one or more software modules, such as the orchestration module 138, the noise elimination module 140, the map module 142, and the deduper module 144. It should be understood that additional and/or alternative devices can provide the functionality described herein via execution of one or more modules, applications, and/or other software. Thus, the illustrated embodiments are illustrative, and should not be viewed as being limiting in any way.

The method 200 will be described with reference to FIGS. 2A-2B and additional reference to FIG. 1. The ladder diagram 200A illustrates the orchestration module 138, the noise elimination 140, the map module 142, and the deduper module 144 executed by the tool tracking system 134. It should be understood that these modules are illustrated as separate software components capable of performing specific operations when executed by one or more processors (hardware or virtual) of the tool tracking system 134. In practice, these modules can be combined in any way.

The method 200 begins and proceeds to operation 202, where the orchestration module 138 collects data from the technician device 116 and the vehicle system 118. The data, in this example, includes a combination of the device data 126, the tool data 128, and the vehicle data 130 (shown collectively as data 126/128/130 in FIG. 2A).

From operation 202, the method 200 proceeds to operation 204. At operation 204, the orchestration module 138 stores the data 126/128/130 in the data store 146. The orchestration module 138 can store the data 126/128/130 in association with the vehicle(s) 102, the service technician(s) 104, the customer(s) 106, the customer location(s) 108, the customer equipment 110, the tool(s) 112, the tool sensor(s) 114, the technician device(s) 116, and the vehicle system(s) 118 via various identifiers disclosed herein and/or the sensor address(es) 120, the device address(es) 122, and/or the vehicle address(es) 124 as the case may be. Moreover, the orchestration module 138 can store the data 126/128/130 using any database technology to enable such associations for additional processing.

From operation 204, the method 200 proceeds to operation 206. At operation 206, the orchestration module 138 periodically or from time-to-time provides the data 126, 128, 130 to the noise elimination module 140 to be cleaned by removal of any noise from the data 126, 128, 130. Noise can be defined as a matter of preference, such as the service provider's preferred definition. As one non-limiting example, the noisy data might include data associated with the tool sensor(s) 114 when a given vehicle 102 in the fleet is stopped, such as at a traffic light or stop sign. This is not the final destination of the vehicle 102 for a given trip, and therefore any data from the tool sensor(s) 114 while the vehicle 102 is stopped (i.e., at a location that is not the customer location 108) can be removed from the data 126/128/130 collected by the orchestration module 138. Noise may take alternative forms not specifically described herein.

From operation 206, the method 200 proceeds to operation 208. At operation 208, the noise elimination module 140 processes the data 126/128/130, resulting in cleaned data 126'/128'/130' that is then sent to the orchestration module 138 to be stored in the data store 146. This process can include eliminating any data that matches a set of criteria defining it as noise. The noise elimination module 140 can process the data 126/128/130 on a per vehicle basis based upon individual trips made by the vehicle 102, and based upon criteria such as when the ignition of the vehicle 102 is ON, when the vehicle 102 is moving, and when the ignition of the vehicle 102 is OFF. Other scenarios can be taken into consideration such as, for example, idling during the trip or a single trip that may include stopping at a traffic signal or stop sign as noted above. The noise elimination module 140 can index the tool data 128 across data collected from a given fleet to identify the tool sensor(s) 114 that were not part of that fleet.

From operation 208, the method proceeds to operation 210. At operation 210, the orchestration module 138 receives the cleaned data 126'/128'/130' from the noise elimination module 140. From operation 210, the method 200 proceeds to operation 212, where the orchestration module 138 provides the cleaned data 126'/128'/130' to the map module 142.

From operation 212, the method 200 proceeds to operation 214. At operation 214, the map module 142 maps the cleaned data 126'/128'/130' to specific vehicle(s) 102 in the fleet, resulting in mapped data 126"/128"/130". From operation 214, the method 200 proceeds to operation 216. At operation 216, the map module 142 provides the mapped data 126"/128"/130" to the orchestration module 138. The orchestration module 138, at operation 218, then provides the mapped data 126"/128"/130" to the deduper module 144.

From operation 218, the method 200 proceeds to operation 220. At operation 220, the deduper module 144 removes duplicate data from the mapped data 126"/128"/130", resulting in deduped data 126'428'430'. From operation 220, the method 200 proceeds to operation 222. At operation 222, the deduper module 144 provides the deduped data 126'''/128'''/130''' to the orchestration module 138.

From operation 222, the method 200 proceeds to operation 224. At operation 224, the orchestration module 138 creates the alert(s) 148 based upon the deduped data 126'''/128'''/130'''. From operation 224, the method 200 proceeds to operation 226. At operation 226, the orchestration module 138 provides the alert(s) 148 to the service technician 104. For example, the orchestration module 138 can send the alert(s) 148 to the service technician 104 via text, voice, image, sound, video, buzzer (e.g., vibration mechanism of the technician device 116), combination thereof, and/or the like. The alert(s) 148 can notify the service technician 104 of the lost tool(s) 132 identified based upon the deduped data 126'''/128'''/130'''. The orchestration module 138 also can provide the alert(s) 148 to the service provider management system 150 for review by the supervisor 152 via the tool management application 154 executing thereon.

From operation 226, the method 200 proceeds to operation 228. The method 200 can end at operation 228.

An example use case of the method 200 will now be described. The service technician 104 travels in the vehicle 102 to the customer location 108 to install new services or repair existing services. The service technician 104 takes the tools 112 that are stored in the vehicle 102, or if the service technician 104 needs a specific tool 112, the service technician 104 may get that tool from a colleague or other source and take the tool 112 with them in the vehicle 102 to the customer location 108. The tool 112 is associated with a tool sensor 114 having an associated sensor address 120, such as a BLE tag. When the service technician 104 puts the tool 112 in the car and turns the ignition ON, the vehicle system 118 is activated (e.g., as part of the OBD2 of the vehicle 102) and scans for a BLE advertisement from the tool sensor 114. This allows the vehicle system 118 to send the data 126/128/130 to the cloud orchestration module 138 along with the reported sensor address 120 (e.g., BLE tag). The vehicle system 118 can report the location and the sensor address 120 while the vehicle 102 is traveling. While traveling, the vehicle system 118 may receive unknown sensor addresses 120 as well, and these also can be sent to the orchestration module 138 for storage in the data store 146.

The service technician 104 may take the tool 112 with them to the customer location 108 and unknowingly leave the tool 112 at the customer location 108 (i.e., the lost tool 132). While returning back to a service provider location (not shown; e.g., a service provider vehicle depot), the vehicle system 118 again reports all sensor addresses 120 that are present based upon a scan of the sensor addresses 120 of the tools 112 on the vehicle 102. The tool tracking system 134 can recognize that the lost tool 132 left the service provider location or other starting location but never returned. The tool tracking system 134 can send an alert 148 to the service technician 104 and/or the supervisor 152. The alert 148 can include the sensor address 120 and/or other identifying information to identify the lost tool 132.

In some instances, the tool 112 may be left at the correct location (e.g., if the service technician 104 intends to return to continue work at a later time), in which case, the supervisor 152 can use the tool management application 154 executed by the service provider management system 150 to manually clear the alert 148 without any further action. However, if the lost tool 132 was forgotten at the customer location 108, the alert 148 can be used as a reminder for the service technician 104 to return to the customer location 108 and recover the lost tool 132.

The orchestration module 138 can perform inventory updates/tracking while the map module 142 is processing the data 126/128/130. The map module 142 also returns, at the end of this process, any new data 126/128/130 (e.g., any new BLE tags, devices, VINS, and/or service technicians it encountered), along with a confidence score with regard to whether the new data 126/128/130 is noise missed by the noise elimination module 140 or indeed new, viable data.

The orchestration module 138 can use a date when a new tool 112, technician device 116, vehicle 102, and/or service technician 104 is/are added to the tool tracking system 134. The orchestration module 138 can use a time window to mark those tools 112, technician devices 116, and/or vehicles 102 that are not in-use or the service technician(s) 104 that are not in a capacity of employment to drive the vehicles 102.

Figure 3:
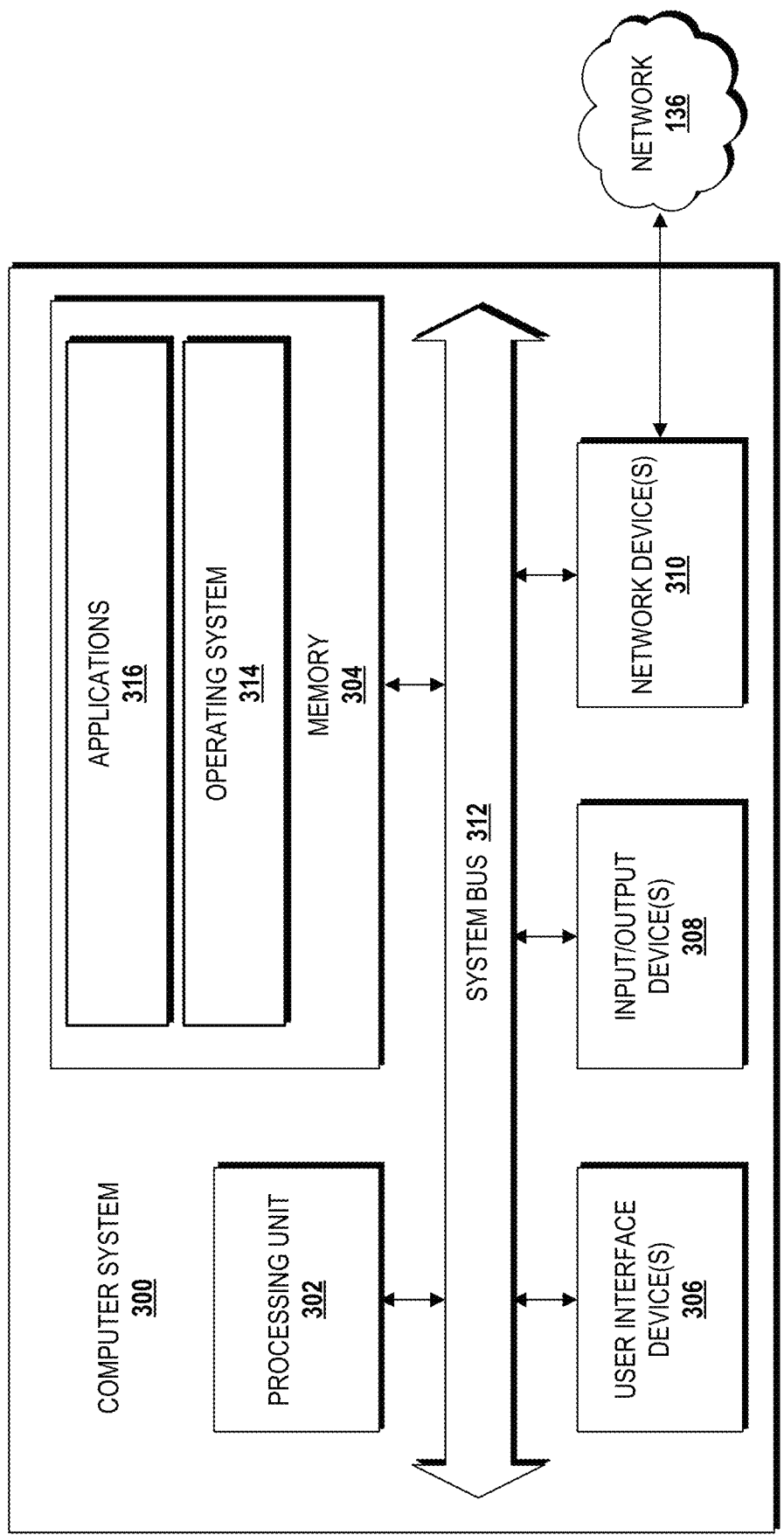
FIG. 3 is a block diagram illustrating an example computer system capable of implementing aspects of the embodiments presented herein.

FIG. 3 is a block diagram illustrating a computer system 300 configured to perform various operations disclosed herein. The computer system 300 includes a processing unit 302, a memory 304, one or more user interface devices 306, one or more input/output ("I/O") devices 308, and one or more network devices 310, each of which is operatively connected to a system bus 312. The system bus 312 enables bi-directional communication between the processing unit 302, the memory 304, the user interface devices 306, the I/O devices 308, and the network devices 310. In some embodiments, the technician device 116, the vehicle system 118, the tool tracking system 134, the service provider management system 150, one or more components thereof, some combination thereof is/are configured, at least in part, like the computer system 300. It should be understood, however, that the technician device 116, the vehicle system 118, the tool tracking system 134, and/or the service provider management system 150 may include additional functionality or include less functionality than now described.

The processing unit 302 might be a standard central processor that performs arithmetic and logical operations, a more specific purpose programmable logic controller ("PLC"), a programmable gate array, or other type of processor known to those skilled in the art and suitable for controlling the operation of the computer system 300. Processing units are generally known, and therefore are not described in further detail herein.

The memory 304 communicates with the processing unit 302 via the system bus 312. In some embodiments, the memory 304 is operatively connected to a memory controller (not shown) that enables communication with the processing unit 302 via the system bus 312. The illustrated memory 304 includes an operating system 314 and one or more applications 316.

The operating system 314 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 306 may include one or more devices with which a user accesses the computer system 300. The user interface devices 306 may include, but are not limited to, computers, servers, personal digital assistants, telephones (e.g., cellular, IP, or landline), or any suitable computing devices. The I/O devices 308 enable a user to interface with the program modules. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, a touchscreen, or an electronic stylus. Further, the I/O devices 308 may include one or more output devices, such as, but not limited to, a display screen or a printer. In some embodiments, the I/O devices 308.

The network devices 310 enable the computer system 300 to communicate with other networks or remote systems via the network 136. Examples of the network devices 310 include, but are not limited to, a modem, a radio frequency ("RF") or infrared ("IR") transceiver, a telephonic interface, a bridge, a router, or a network card. The network 136 may include a wireless network such as, but not limited to, a WLAN such as a WI-FI network, a WWAN, a wireless PAN ("WPAN") such as BLUETOOTH, or a wireless MAN ("WMAN"). Alternatively, the network 136 may be a wired network such as, but not limited to, a WAN such as the Internet, a LAN such as the Ethernet, a wired PAN, or a wired MAN.

Figure 4:
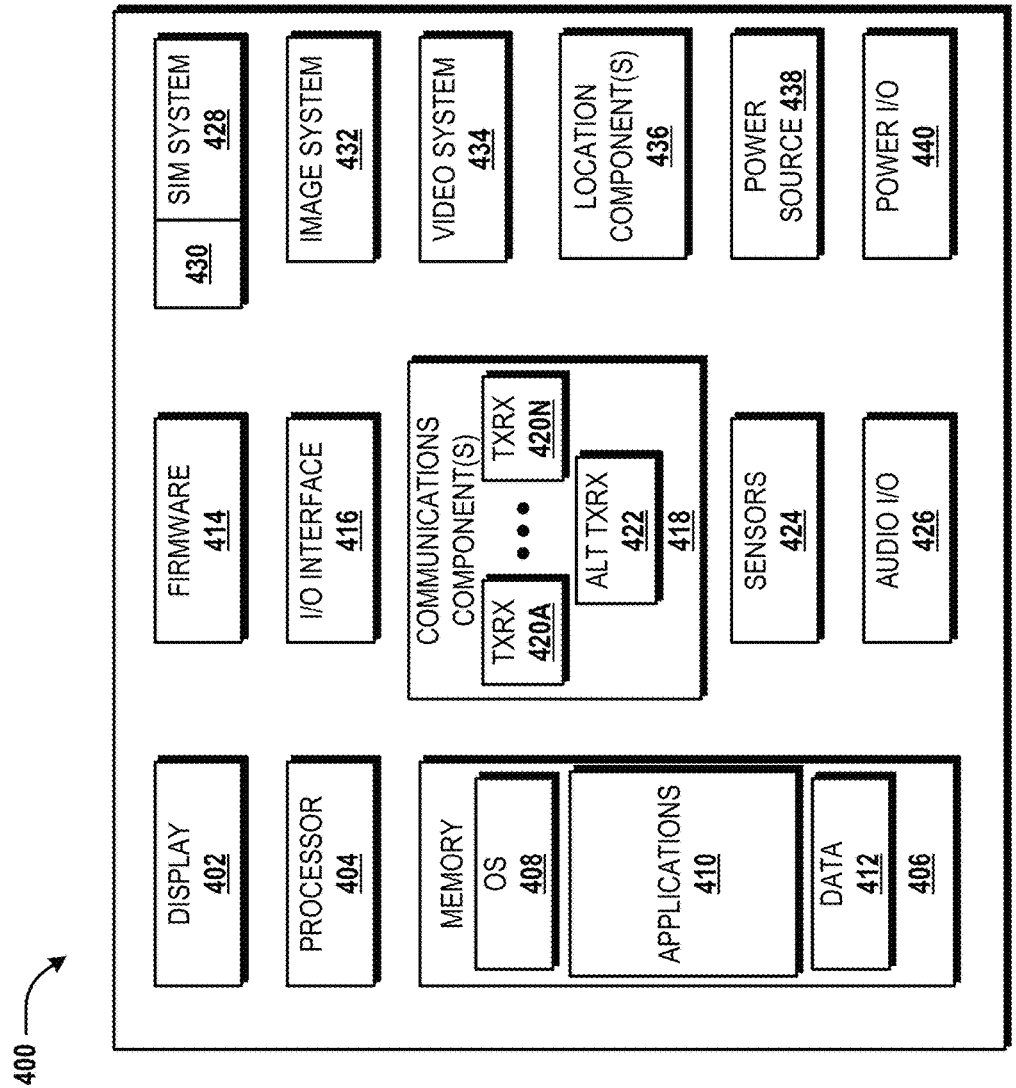
FIG. 4 is a block diagram illustrating an example mobile device capable of implementing aspects of the embodiments disclosed herein.

Turning now to FIG. 4, an illustrative mobile device 400 and components thereof will be described. In some embodiments, the technician device 116 described above with reference to FIG. 1 can be configured as and/or can have an architecture similar or identical to the mobile device 400 described herein in FIG. 4. It should be understood, however, that the technician device 116 may or may not include the functionality described herein with reference to FIG. 4. While connections are not shown between the various components illustrated in FIG. 4, it should be understood that some, none, or all of the components illustrated in FIG. 4 can be configured to interact with one another to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 for displaying data. According to various embodiments, the display 402 can be configured to display the device data 126, the tool data 128, the vehicle data 130, the alert(s) 148, network connection information, various GUI elements, text, images, video, virtual keypads and/or keyboards, messaging data, notification messages, metadata, Internet content, device status, time, date, calendar data, device preferences, map and location data, combinations thereof, and/or the like. The mobile device 400 also can include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408, one or more applications 410, other computer-executable instructions stored in the memory 406, or the like. In some embodiments, the applications 410 also can include a UI application (not illustrated in FIG. 4).

The UI application can interface with the operating system 408 to facilitate user interaction with functionality and/or data stored at the mobile device 400 and/or stored elsewhere. In some embodiments, the operating system 408 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid a user in data communications, entering/deleting data, entering and setting user IDs and passwords for device access, configuring settings, manipulating content and/or settings, multimode interaction, interacting with other applications 410, and otherwise facilitating user interaction with the operating system 408, the applications 410, and/or other types or instances of data 412 (e.g., the device data 126 and/or the tool data 128) that can be stored at the mobile device 400.

The applications 410, the data 412, and/or portions thereof can be stored in the memory 406 and/or in a firmware 414, and can be executed by the processor 404. The firmware 414 also can store code for execution during device power up and power down operations. It can be appreciated that the firmware 414 can be stored in a volatile or non-volatile data storage device including, but not limited to, the memory 406 and/or a portion thereof.

The mobile device 400 also can include an input/output ("I/O") interface 416. The I/O interface 416 can be configured to support the input/output of data such as location information, presence status information, user IDs, passwords, and application initiation (start-up) requests. In some embodiments, the I/O interface 416 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 also can include a communications component 418. The communications component 418 can be configured to interface with the processor 404 to facilitate wired and/or wireless communications with one or more networks. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments, one or more of the transceivers of the communications component 418 may be configured to communicate using GSM, CDMAONE, CDMA2000, LTE, and various other 2G, 2.5G, 3G, 4G, 4.5G, 5G, and greater generation technology standards. Moreover, the communications component 418 may facilitate communications over various channel access methods (which may or may not be used by the aforementioned standards) including, but not limited to, TDMA, FDMA, W-CDMA, OFDM, SDMA, and the like.

In addition, the communications component 418 may facilitate data communications using GPRS, EDGE, the HSPA protocol family including HSDPA, EUL or otherwise termed HSUPA, HSPA+, and various other current and future wireless data access standards. In the illustrated embodiment, the communications component 418 can include a first transceiver ("TxRx") 420A that can operate in a first communications mode (e.g., GSM). The communications component 418 also can include an $N^{th}$ transceiver ("TxRx") 420N that can operate in a second communications mode relative to the first transceiver 420A (e.g., UMTS). While two transceivers 420A-420N (hereinafter collectively and/or generically referred to as "transceivers 420") are shown in FIG. 4, it should be appreciated that less than two, two, and/or more than two transceivers 420 can be included in the communications component 418.

The communications component 418 also can include an alternative transceiver ("Alt TxRx") 422 for supporting other types and/or standards of communications. According to various contemplated embodiments, the alternative transceiver 422 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 418 also can facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 also can include one or more sensors 424. The sensors 424 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 also can include a subscriber identity module ("SIM") system 428. The SIM system 428 can include a universal SIM ("USIM"), a universal integrated circuit card ("UICC") and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Because other devices and/or modules for identifying users and/or the mobile device 400 are contemplated, it should be understood that these embodiments are illustrative, and should not be construed as being limiting in any way.

The mobile device 400 also can include an image capture and processing system 432 ("image system"). The image system 432 can be configured to capture or otherwise obtain photos, videos, and/or other visual information. As such, the image system 432 can include cameras, lenses, charge-coupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to an MMS message, email message, and sent to another device. The video and/or photo content also can be shared with other devices via various types of data transfers via wired and/or wireless communication devices as described herein.

The mobile device 400 also can include one or more location components 436. The location components 436 can be configured to send and/or receive signals to determine a geographic location of the mobile device 400. According to various embodiments, the location components 436 can send and/or receive signals from global positioning system ("GPS") devices, assisted-GPS ("A-GPS") devices, WI-FI/WIMAX and/or cellular network triangulation data, combinations thereof, and the like. The location component 436 also can be configured to communicate with the communications component 418 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 424 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 also can include a power source 438. The power source 438 can include one or more batteries, power supplies, power cells, and/or other power subsystems including alternating current ("AC") and/or direct current ("DC") power devices. The power source 438 also can interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 400 or other devices or computers described herein, such as the computer system 400 described above with reference to FIG. 4. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 400 in order to store and execute the software components presented herein. It is also contemplated that the mobile device 400 may not include all of the components shown in FIG. 4, may include other components that are not explicitly shown in FIG. 4, or may utilize an architecture completely different than that shown in FIG. 4.

Figure 5:
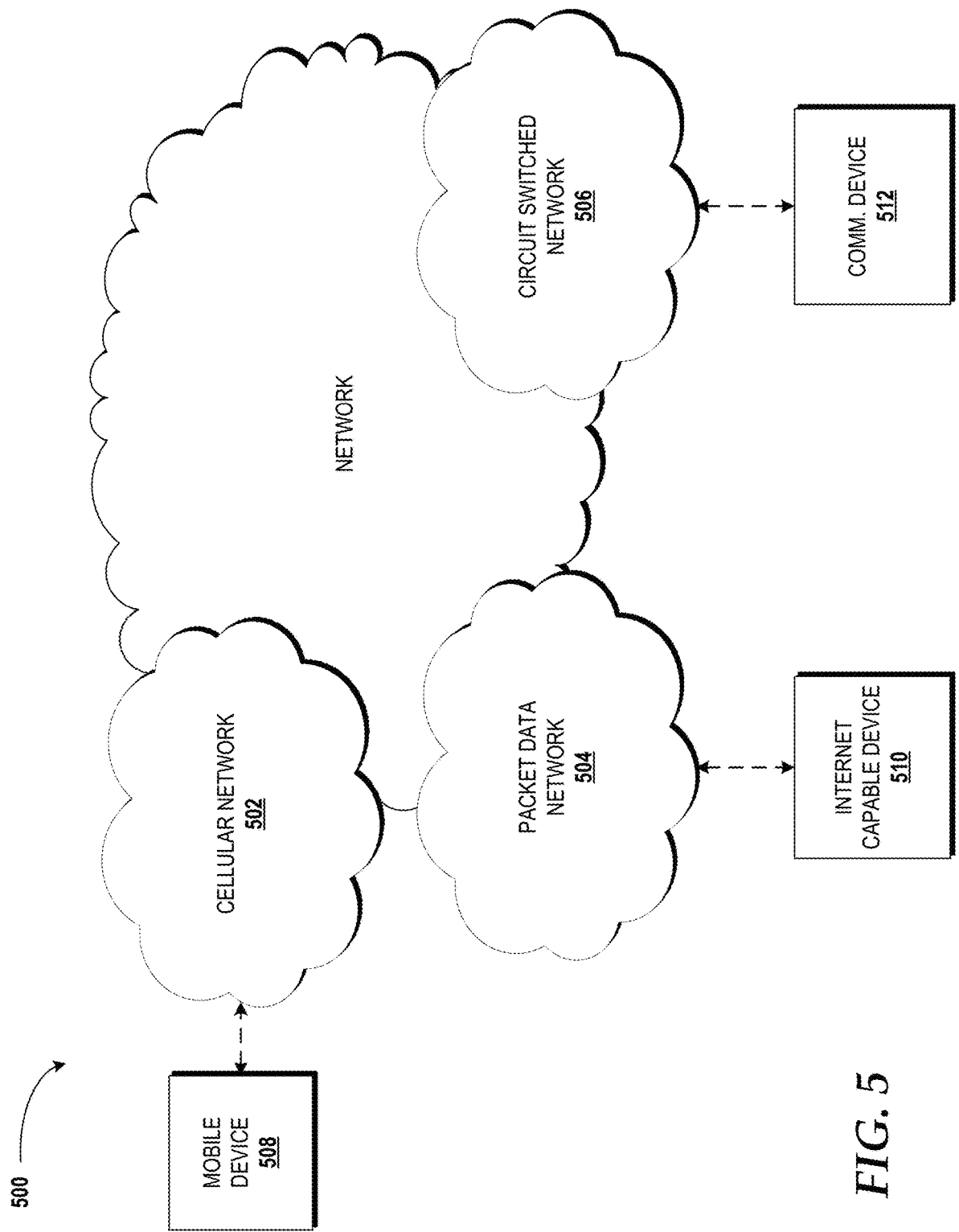
FIG. 5 is a diagram illustrating a network, according to an illustrative embodiment.

Turning now to FIG. 5, details of a network 500 are illustrated, according to an illustrative embodiment. The network 500 includes a cellular network 502, a packet data network 504, and a circuit switched network 506 (e.g., a public switched telephone network). In some embodiments, the network 136 (shown in FIG. 1) is configured, at least in part, like the network 500.

The cellular network 502 includes various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, the technician device 116, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards such as LTE, or the like, as well as evolved and future mobile standards.

The packet data network 504 includes various devices, for example, servers, computers, databases, and other devices in communication with one another, as is generally known. In some embodiments, the packet data network 504 is or includes one or more WI-FI networks, each of which can include one or more WI-FI access points, routers, switches, and other WI-FI network components. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system ("POTS"). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, the technician device 116, the vehicle system 118, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510.

Figure 6:
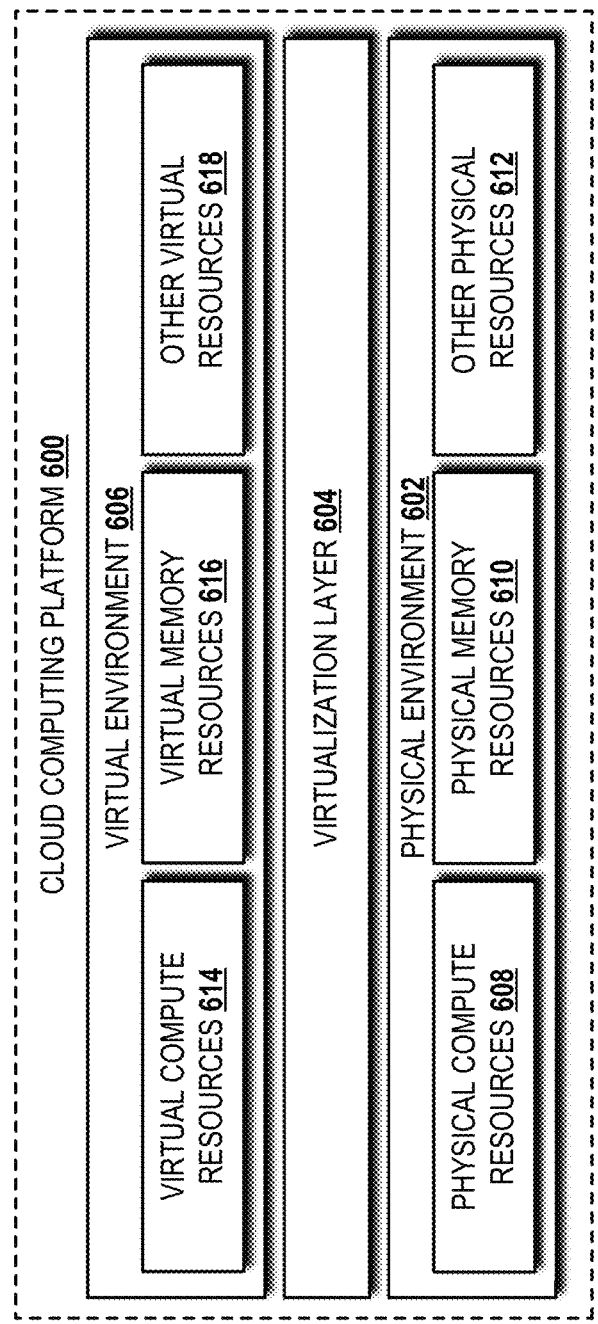
FIG. 6 is a diagram illustrating a cloud computing platform capable of implementing aspects of the embodiments disclosed herein.

Turning now to FIG. 6, an illustrative cloud computing platform 600 will be described, according to an illustrative embodiment. The tool tracking system 134 and/or other networks, systems, and/or devices disclosed herein can be implemented and/or controlled, at least in part, in/by the cloud computing platform 600.

The cloud computing platform 600 includes a physical environment 602, a virtualization layer 604, and a virtual environment 606. While no connections are shown in FIG. 6, it should be understood that some, none, or all of the components illustrated in FIG. 6 can be configured to interact with one other to carry out various functions described herein. In some embodiments, the components are arranged so as to communicate via one or more networks. Thus, it should be understood that FIG. 6 and the remaining description are intended to provide a general understanding of a suitable environment in which various aspects of the embodiments described herein can be implemented, and should not be construed as being limiting in any way.

The physical environment 602 provides hardware resources that, in the illustrated embodiment, include one or more physical compute resources 608, one or more physical memory resources 610, and one or more other physical resources 612. The physical compute resource(s) 608 can include one or more hardware components that perform computations to process data and/or to execute computer-executable instructions of one or more application programs, one or more operating systems, and/or other software. The physical compute resources 608 can include one or more central processing units ("CPUs") configured with one or more processing cores. The physical compute resources 608 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the physical compute resources 608 can include one or more discrete GPUs. In some other embodiments, the physical compute resources 608 can include CPU and GPU components that are configured in accordance with a co-processing CPU/GPU computing model, wherein the sequential part of an application executes on the CPU and the computationally-intensive part is accelerated by the GPU processing capabilities. The physical compute resources 608 can include one or more system-on-chip ("SoC") components along with one or more other components, including, for example, one or more of the physical memory resources 610, and/or one or more of the other physical resources 612. In some embodiments, the physical compute resources 608 can be or can include one or more SNAPDRAGON SoCs, available from QUALCOMM of San Diego, California; one or more TEGRA SoCs, available from NVIDIA of Santa Clara, California; one or more HUMMINGBIRD SoCs, available from SAMSUNG of Seoul, South Korea; one or more Open Multimedia Application Platform ("OMAP") SoCs, available from TEXAS INSTRUMENTS of Dallas, Texas; one or more customized versions of any of the above SoCs; and/or one or more proprietary SoCs. The physical compute resources 608 can be or can include one or more hardware components architected in accordance with an ARM architecture, available for license from ARM HOLDINGS of Cambridge, United Kingdom. Alternatively, the physical compute resources 608 can be or can include one or more hardware components architected in accordance with an x86 architecture, such an architecture available from INTEL CORPORATION of Mountain View, California, and others. Those skilled in the art will appreciate the implementation of the physical compute resources 608 can utilize various computation architectures, and as such, the physical compute resources 608 should not be construed as being limited to any particular computation architecture or combination of computation architectures, including those explicitly disclosed herein.

The physical memory resource(s) 610 can include one or more hardware components that perform storage/memory operations, including temporary or permanent storage operations. In some embodiments, the physical memory resource(s) 610 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the physical compute resources 608.

The other physical resource(s) 612 can include any other hardware resources that can be utilized by the physical compute resources(s) 608 and/or the physical memory resource(s) 610 to perform operations described herein. The other physical resource(s) 612 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The physical resources operating within the physical environment 602 can be virtualized by one or more virtual machine monitors (not shown; also known as "hypervisors") operating within the virtualization/control layer 604 to create virtual resources that reside in the virtual environment 606. The virtual machine monitors can be or can include software, firmware, and/or hardware that alone or in combination with other software, firmware, and/or hardware, creates and manages virtual resources operating within the virtual environment 606.

The virtual resources operating within the virtual environment 606 can include abstractions of at least a portion of the physical compute resources 608, the physical memory resources 610, and/or the other physical resources 612, or any combination thereof, shown as virtual compute resources 614, virtual memory resources 616, and other virtual resources 618, respectively. In some embodiments, the abstractions can include one or more virtual machines upon which one or more applications can be executed.

Based on the foregoing, it should be appreciated that concepts and technologies for automated equipment tracking for service technicians have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

The invention claimed is:

1. A tool tracking system comprising:
a processor; and
a memory having computer-executable instructions stored thereon that, when executed by the processor, cause the processor to perform operations comprising
receiving, from a vehicle system of a first vehicle, via a network, vehicle data associated with the vehicle system of the first vehicle and tool data, wherein at least a first portion of the tool data is associated with a tool to be utilized by a service technician to provide, at least in part, a service at a customer location, wherein at least the first portion of the tool data is received by the vehicle system of the first vehicle from a tool sensor of the tool, wherein at least the first portion of the tool data comprises a sensor address that uniquely identifies the tool sensor and a signal strength of a connection between the tool sensor and the vehicle system of the first vehicle, and wherein the tool is present in a second vehicle,
storing the tool data in a data store of the tool tracking system,
mapping, based at least in part on the tool data being received by the vehicle system of the first vehicle, at least the first portion of the tool data associated with the tool present in the second vehicle to the first vehicle to create a record,
determining that the sensor address associated with the tool sensor of the tool is being reported by both the vehicle system of the first vehicle and a vehicle system of the second vehicle,
in response to determining that the sensor address associated with the tool sensor of the tool is being reported by both the vehicle system of the first vehicle and the vehicle system of the second vehicle, determining, based at least in part on the signal strength of the connection between the tool sensor and the vehicle system of the first vehicle, that the tool is present in the second vehicle instead of the first vehicle,
in response to determining that the tool is present in the second vehicle instead of the first vehicle,
removing the record mapping at least the first portion of the tool data to the first vehicle from the data store, and
mapping at least the first portion of the tool data to the second vehicle,
determining, based at least in part on the vehicle data associated with the vehicle system of the first vehicle, that at least a second portion of the tool data was collected by the vehicle system of the first vehicle while the first vehicle was stopped at a location other than the customer location, and
in response to determining that at least the second portion of the tool data was collected while the first vehicle was stopped at a location other than the customer location, removing at least the second portion of the tool data from the data store.

2. The tool tracking system of claim 1, wherein receiving, from the vehicle system of the first vehicle, the vehicle data associated with the vehicle system of the first vehicle and the tool data comprises receiving, from the vehicle system of the first vehicle, the tool data in response to a scan performed by the vehicle system of the first vehicle to identify the tool via the tool sensor of the tool.

3. The tool tracking system of claim 2, wherein the vehicle data uniquely identifies the first vehicle and a location of the first vehicle when the scan was performed by the vehicle system of the first vehicle.

4. The tool tracking system of claim 3, wherein mapping the tool data to the first vehicle comprises mapping the tool data to the vehicle data and to the location of the first vehicle after the scan was performed by the vehicle system of the first vehicle.

5. The tool tracking system of claim 1, wherein the operations further comprise:
processing remaining tool data mapped to the first vehicle; and
eliminating any of the remaining tool data determined to be noise.

6. The tool tracking system of claim 5, wherein eliminating any of the remaining tool data determined to be noise comprises eliminating any of the remaining tool data that matches a set of criteria.

7. A computer-readable storage medium having computer-executable instructions stored thereon that, when executed by a processor of a tool tracking system, cause the processor to perform operations comprising:
receiving, from a vehicle system of a first vehicle, via a network, vehicle data associated with the vehicle system of the first vehicle and tool data, wherein at least a first portion of the tool data is associated with a tool to be utilized by a service technician to provide, at least in part, a service at a customer location, wherein at least the first portion of the tool data is received by the vehicle system of the first vehicle from a tool sensor of the tool, wherein at least the first portion of the tool data comprises a sensor address that uniquely identifies the tool sensor and a signal strength of a connection between the tool sensor and the vehicle system of the first vehicle, and wherein the tool is present in a second vehicle;
storing the tool data in a data store of the tool tracking system;
mapping, based at least in part on the tool data being received by the vehicle system of the first vehicle, at least the first portion of the tool data associated with the tool present in the second vehicle to the first vehicle to create a record;
determining that the sensor address associated with the tool sensor of the tool is being reported by both the vehicle system of the first vehicle and a vehicle system of the second vehicle;
in response to determining that the sensor address associated with the tool sensor of the tool is being reported by both the vehicle system of the first vehicle and the vehicle system of the second vehicle, determining, based at least in part on the signal strength of the connection between the tool sensor and the vehicle system of the first vehicle, that the tool is present in the second vehicle instead of the first vehicle;
in response to determining that the tool is present in the second vehicle instead of the first vehicle,
removing the record mapping at least the first portion of the tool data to the first vehicle from the data store, and
mapping at least the first portion of the tool data to the second vehicle;
determining, based at least in part on the vehicle data associated with the vehicle system of the first vehicle, that at least a second portion of the tool data was collected by the vehicle system of the first vehicle while the first vehicle was stopped at a location other than the customer location; and
in response to determining that at least the second portion of the tool data was collected while the first vehicle was stopped at a location other than the customer location, removing at least the second portion of the tool data from the data store.

8. The computer-readable storage medium of claim 7, wherein receiving, from the vehicle system of the first vehicle, the vehicle data associated with the vehicle system of the first vehicle and the tool data comprises receiving, from the vehicle system of the first vehicle, the tool data in response to a scan performed by the vehicle system of the first vehicle to identify the tool via the tool sensor of the tool.

9. The computer-readable storage medium of claim 8, wherein the vehicle data uniquely identifies the first vehicle and a location of the first vehicle when the scan was performed by the vehicle system of the first vehicle.

10. The computer-readable storage medium of claim 9, wherein mapping the tool data to the first vehicle comprises mapping the tool data to the vehicle data and to the location of the first vehicle after the scan was performed by the vehicle system of the first vehicle.

11. The computer-readable storage medium of claim 7, wherein the operations further comprise:
processing remaining tool data mapped to the first vehicle; and
eliminating any of the remaining tool data determined to be noise.

12. The computer-readable storage medium of claim 11, wherein eliminating any of the remaining tool data determined to be noise comprises eliminating any of the remaining tool data that matches a set of criteria.

13. A method comprising:
receiving, by a tool tracking system comprising a processor, from a vehicle system of a first vehicle, via a network, vehicle data associated with the vehicle system of the first vehicle and tool data, wherein at least a first portion of the tool data is associated with a tool to be utilized by a service technician to provide, at least in part, a service at a customer location, wherein at least the first portion of the tool data is received by the vehicle system of the first vehicle from a tool sensor of the tool, wherein at least the first portion of the tool data comprises a sensor address that uniquely identifies the tool sensor and a signal strength of a connection between the tool sensor and the vehicle system of the first vehicle, and wherein the tool is present in a second vehicle;
storing, by the tool tracking system, the tool data in a data store of the tool tracking system;
mapping, by the tool tracking system, based at least in part on the tool data being received by the vehicle system of the first vehicle, at least the first portion of the tool data associated with the tool present in the second vehicle to the first vehicle to create a record;
determining, by the tool tracking system, that the sensor address associated with the tool sensor of the tool is being reported by both the vehicle system of the first vehicle and a vehicle system of the second vehicle;
in response to determining that the sensor address associated with the tool sensor of the tool is being reported by both the vehicle system of the first vehicle and the vehicle system of the second vehicle, determining, by the tool tracking system, based at least in part on the signal strength of the connection between the tool sensor and the vehicle system of the first vehicle, that the tool is present in the second vehicle instead of the first vehicle;
in response to determining that the tool is present in the second vehicle instead of the first vehicle,
removing, by the tool tracking system, the record mapping at least the first portion of the tool data to the first vehicle from the data store, and
mapping, by the tool tracking system, at least the first portion of the tool data to the second vehicle;
determining, by the tool tracking system, based at least in part on the vehicle data associated with the vehicle system of the first vehicle, that at least a second portion of the tool data was collected by the vehicle system of the first vehicle while the first vehicle was stopped at a location other than the customer location; and in response to determining that at least the second portion of the tool data was collected while the first vehicle was stopped at a location other than the customer location, removing, by the tool tracking system, at least the second portion of the tool data from the data store.

14. The method of claim 13, receiving, from the vehicle system of the first vehicle, the vehicle data associated with the vehicle system of the first vehicle and the tool data comprises receiving, from the vehicle system of the first vehicle, the tool data in response to a scan performed by the vehicle system of the first vehicle to identify the tool via the tool sensor of the tool.

15. The method of claim 14, wherein the vehicle data uniquely identifies the first vehicle and a location of the first vehicle when the scan was performed by the vehicle system of the first vehicle.

16. The method of claim 15, wherein mapping the tool data to the first vehicle comprises mapping the tool data to the vehicle data and to the location of the first vehicle after the scan was performed by the vehicle system of the first vehicle.

17. The method of claim 13, further comprising:
processing remaining tool data mapped to the first vehicle; and
eliminating any of the remaining tool data determined to be noise.

18. The method of claim 17, wherein eliminating any of the remaining tool data determined to be noise comprises eliminating any of the remaining tool data that matches a set of criteria.

\* \* \* \* \*